UNITED STATES PATENT OFFICE.

ERIC EDWARD DUTT, OF JABALPUR, INDIA.

PROCESS FOR THE MANUFACTURE OF ALUMINA.

1,332,115.  Specification of Letters Patent.  Patented Feb. 24, 1920.

No Drawing. Application filed October 18, 1918, Serial No. 258,711. Renewed November 29, 1919. Serial No. 341,516.

*To all whom it may concern:*

Be it known that I, ERIC EDWARD DUTT, a subject of the King of Great Britain, residing at Jabalpur, in the Central Provinces of British India, have invented a new and Improved Process for the Manufacture of Alumina, of which the following is a full, clear, and exact description.

This invention relates to a process for the manufacture of alumina from aluminous substances, such as clay, bauxite, or any other mineral or compound, one of the ingredients of which is an aluminium compound.

The object of the invention is to obtain, from minerals or compounds containing aluminium alumina in a pure form.

The substance containing aluminium is mixed with an alkaline earth metal chlorid, and then subjected to heat and the action of arsenic trioxid.

The substances above mentioned are preferably used in powdered form and in proportion as given below.

Calcined clay (containing about 35% $Al_2O_3$) 300 parts. The alkaline earth metal chlorid is preferably calcium chlorid, 120 parts.

The mixture of the above mentioned ingredients is then placed in a retort or muffle, made of suitable refractory material.

At one end the retort or muffle is provided with an inlet tube, and at the other suitable appliances for charging and discharging the retort or muffle, and also a delivery tube.

The retort or muffle is heated to a red heat. The arsenic compound I prefer to use is the trioxid, which is introduced into the hot charge in the retort or muffle, in a state of vapor. The quantity used is 133 parts. It is prepared in a separate apparatus, for the boiling point of arsenic trioxid is 218° C., which temperature is considerably below the temperature at which reaction takes place in the retort or muffle.

The arsenic trioxid is introduced through the inlet tube, and the contact of the same with the charge is insured, for it is forced to cross the entire charge before it can reach the out-let of the retort or muffle.

The trioxid of arsenic at the temperature of the retort or muffle reacts with the chlorin of the calcium chlorid, forming arsenic trichlorid, the calcium reacting with the aluminium produces calcium aluminate.

The silica, iron and other impurities contained in the clay or other compound used remain unaffected.

The arsenic trichlorid formed passes out of the retort or muffle through the outlet tube, and is decomposed by means of steam. Hydrochloric acid gas and arsenic trioxid are obtained.

The trioxid is condensed in a flue and the hydrochloric acid gas absorbed in water, liquid hydrochloric acid being obtained.

After the required amount of arsenic trioxid vapors have been introduced and the reactions are complete, the charge is removed from the retort or muffle and treated with the hydrochloric acid obtained at an earlier stage in the process. The calcium aluminate is decomposed and yields a mixture of aluminium and calcium chlorids, which pass into solution.

A part of the iron may also pass into solution in the form of iron chlorid, but the silica is unacted upon.

The solution of chlorids is decanted from the insoluble residue and calcium aluminate added to the solution in the proportions required by the following equation in order to precipitate aluminium hydroxid, thus:—

$$2AlCl_3 + 3CaAl_2O_4 + 12H_2O = 4Al_2(OH)_6 + 3CaCl_2.$$

The iron present is not precipitated.

The aluminium hydroxid obtained is washed, dried and calcined to drive off the water of hydration. The residue consists of a very pure alumina.

The solution of calcium chlorid obtained at an earlier stage in the process is freed from iron impurities by the addition of calcium hydroxid and evaporated to dryness. The residue consists of calcium chlorid which may be used over again in the process.

I claim:

1. The process for the manufacture of alumina which consists in mixing a substance containing combined aluminium and an alkaline earth metal chlorid subjecting the mixture to a temperature of about a red heat, passing vapors of arsenic trioxid through the hot mixture to convert the aluminium in the substance into an alkaline earth metal aluminate, acting upon the so treated mass with hydrochlorid acid, thereby forming aluminium chlorid, precipitating the alumina from the solution of chlorid by means of calcium aluminate, separating the precipitate from the solution, and heating the precipitate to form alumina by driving off the water of hydration.

2. A process for the manufacture of alumina which consists in mixing a substance containing combined aluminium with calcium chlorid, heating the mixture to a temperature of about a red heat, passing through the heated mixture arsenic trioxid to convert the aluminium present in the substance into calcium aluminate, treating the calcium aluminate with hydrochloric acid, adding calcium aluminate to the solution of chlorid obtained to precipitate aluminium hydroxid, separating the precipitate from the liquid, and calcining the precipitate to drive off the water of hydration.

3. The process for the manufacture of alumina, which consists in mixing clay or bauxite with calcium chlorid, heating the mixture to a temperature of about a red heat, passing arsenic trioxid through the hot mixture to convert the aluminium in the clay, or bauxite into calcium aluminate, treating the calcium aluminate with hydrochloric acid, precipitating aluminium hydroxid from the chlorid so obtained by means of calcium aluminate, separating the liquid from the precipitate, and calcining the precipitate to drive off the water of hydration.

4. A process for the manufacture of alumina, comprising a step, which consists in subjecting clay, or bauxite to the action of gaseous arsenic trioxid, in the presence of calcium chlorid.

In testimony that I claim the foregoing as my invention I have signed my name this 22nd day of July, 1918.

ERIC EDWARD DUTT.